United States Patent Office 3,767,736
Patented Oct. 23, 1973

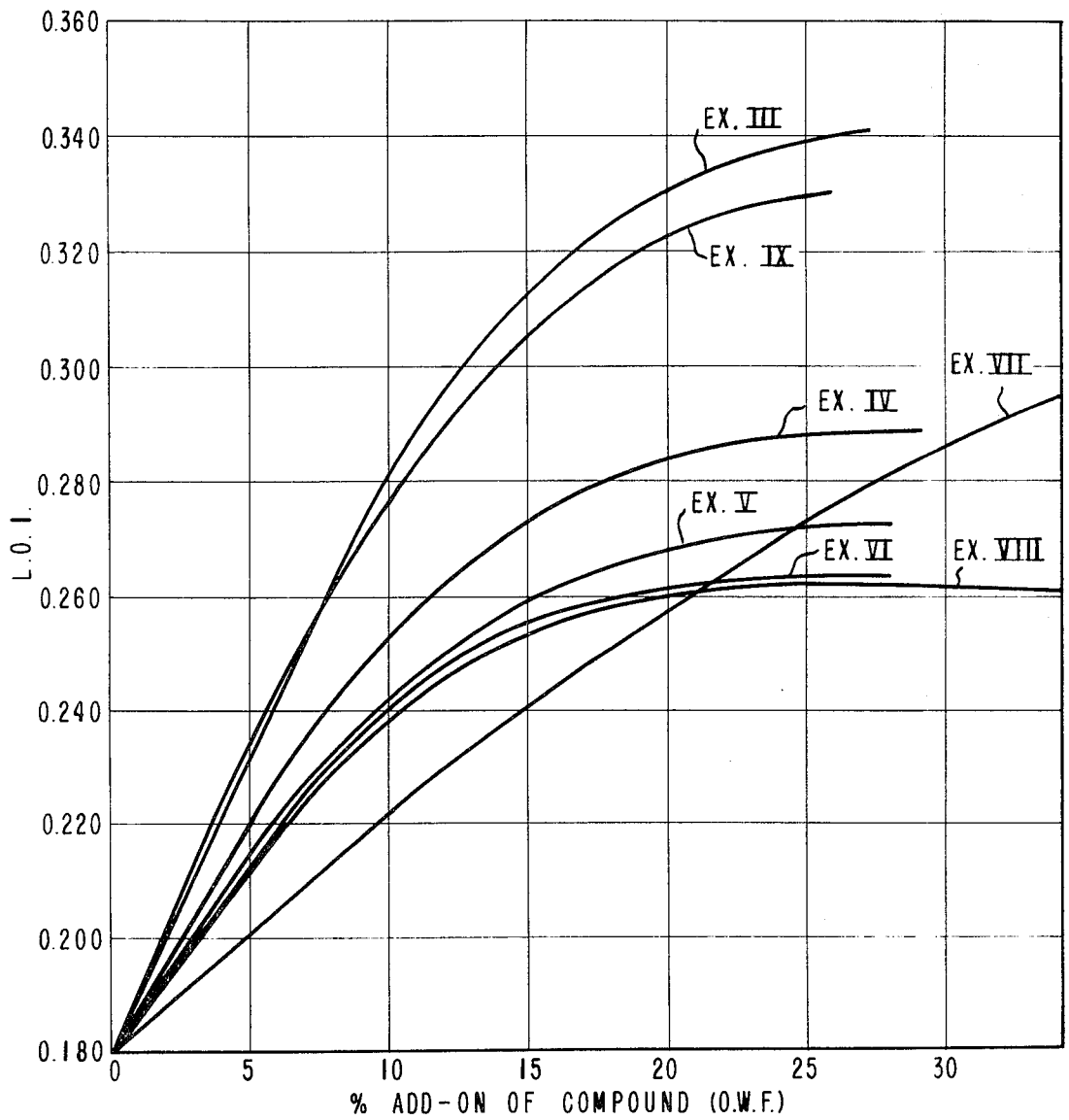

3,767,736
DIALKYL N-SUBSTITUTED PHOSPHORAMIDATE CONTAINING FLAME RETARDANTS
Patrick Michael Burke, Wilmington, Del., assignor to E. I. du Pont de Nemours and Company, Wilmington, Del.
Filed Oct. 13, 1970, Ser. No. 80,388
Int. Cl. C07f 9/24
U.S. Cl. 260—950
5 Claims

ABSTRACT OF THE DISCLOSURE

Cellulosic material can be flameproofed by incorporating in it a flameproofing amount of a phosphorus compound having the formula

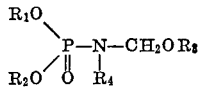

wherein $R_1$ is a $C_1$ to $C_3$ alkyl group, $R_2$ is a $C_1$ to $C_3$ alkyl group, or $R_1+R_2$ is a $C_3$ to $C_5$ alkylene group with its valencies in 1,3-relation; $R_3$ is H or a $C_1$ to $C_3$ alkyl group; and $R_4$ is H, —$CH_3$, —$C_2H_5$ or —$CH_2OR_3$. Novel flameproofing compounds are those in which each of $R_1$ and $R_2$ is $CH_3$, $R_4$ is H and $R_3$ is H or a $C_1$ to $C_3$ alkyl group. Other novel flameproofing compounds are those in which $R_1$ is a $C_1$ to $C_3$ alkyl group, $R_2$ is a $C_1$ to $C_3$ alkyl group, $R_3$ is H or a $C_1$ to $C_3$ alkyl group and $R_4$ is $CH_2OR_3$, in which $R_3$ is defined as above. Water-soluble aminoplast resin precondensates containing at least two moles of condensed formaldehyde can be combined with the phosphorus compounds to improve durability of flameproofing to laundering.

BACKGROUND OF THE INVENTION

It is known to produce flame retardancy on cotton by loading it with phosphorus-containing compounds such as tetra(hydroxymethyl) phosphonium chloride (THPC), aziridinyl phosphine oxides (APO) and the methylol amide of the dimethyl ester of carboxyethylphosphonic acid. Such compounds can all be applied on cotton fabric from an aqueous medium and left there by removing the aqueous medium and heating the fabric.

An amount of THPC sufficient to produce flame retardancy makes the treated fabric stiff. Flame retardancy based on APO requires the application of APO, a toxic compound, from a pad bath which tends to be unstable. The methylol amide of the dimethyl ester of carboxyethylphosphonic acid must be present on the fabric in large amounts for effective fire retardancy.

The diallyl ester of N-(hydroxymethyl) phosphoramidic acid has been proposed as a flameproofing agent. However, this compound is readily polymerizable and is disclosed to be water-insoluble. Its utility is damaged by its unreliable storage life. It required the use of organic solvents, an expensive medium for flameproofing treatment. Its flameproofing efficiency is low.

The bis-(2,3-dibromopropyl) ester of phoshoramidic acid has also been disclosed to flameproof cotton and cellulose acetate fabrics. However, it also requires organic solvents. In addition, the flameproofed fabric it produces tends to be wet and clammy though free of solvent.

Flame retardant compounds can also be applied in combination with resins to produce greater flame retardancy or to produce flame retardancy which persists after dry cleaning treatments and launderings.

Among these combination types is a fire-weather-water resistant composition consisting essentially of antimony oxide in a highly chlorinated paraffin wax and a binder. This composition, used frequently on tent material, stiffens fabric on which it is used and loses its protective properties easily by dry cleaning or laundering.

Both THPC and APO based combinations are also used, but the inherent stiffness of treated fabric without resins is only made more severe by the resin inclusion.

British 790,663 discloses the fire retardancy treatment of cotton with a solution of the diethyl ester of phosphoramidic acid and dimethylol melamine to produce an impregnated cotton which after heating becomes flameproof. U.S. 2,838,228, Glade et al., discloses flameproofing of cotton fabric using an aqueous solution of the dimethyl or the diethyl ester of phosphoramidic acid with a dimethylated trimethylol melamine. British 835,581, discloses the wash resistant flameproofing of rayon fabric by impregnating the fabric with an aqueous solution of the bis-2-chloroethylester of phosphoramidic acid and a water-soluble aminoplast resin precondensate such as trimethylol melamine. Flameproofed fabrics produced by these combinations are considerably stiffer than before flameproofing. In the case of the use of the 2-chloroethyl ester an apparently homogeneous solution exists only in the concentrated form, dilution of the concentrated form with water causing precipitation from the solution when a conveniently useful concentration is sought. In addition, they lose flameproof properties quickly as a result of multiple launderings of the flameproofed fabrics.

SUMMARY OF THE INVENTION

Cellulosic material can be flameproofed by incorporating in them a sufficient amount of a phosphorus compound having the formula

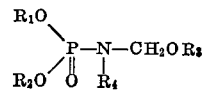

wherein $R_1$ is a $C_1$ to $C_3$ alkyl group, $R_2$ is a $C_1$ to $C_3$ alkyl group or $R_1+R_2$ is a $C_3$ to $C_5$ alkylene group with its valencies in 1,3-relation; $R_3$ is H or a $C_1$ to $C_3$ alkyl group; and $R_4$ is H, —$CH_3$, —$C_2H_5$ or —$CH_2OR_3$. The flameproofing compound can be combined with a water-soluble aminoplast resin precondensate containing for each mole of aminoplast resin precondensate at least two moles of condensed formaldehyde as N-hydroxymethyl or N-alkoxymethyl. The flameproofing compositions are applied from water solution. When $R_1=$ —$CH_3$, $R_2=$ —$CH_3$, $R_3$ is H or a $C_1$ to $C_3$ alkyl group and $R_4=$H, the compounds are novel flameproofing compounds having unexpectedly good flameproofing characteristics. Where $R_1$ is a $C_1$ to $C_3$ alkyl group, $R_2$ is a $C_1$ to $C_3$ alkyl group, $R_3$ is H or a $C_1$ to $C_3$ alkyl group and $R_4$ is —$CH_2OR_3$, where $R_3$ is defined as above, the compounds are capable of providing flameproofing which exhibits outstanding durability to home laundering.

DESCRIPTION OF THE INVENTION

With reference to the drawing, the figure shows an efficiency graph of the fireproofing compositions exemplified in Examples III–IX. The graph shows the effect of amount of composition vs. L.O.I.

Phosphorus compounds of the formula

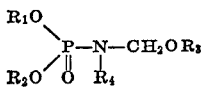

wherein $R_1$ is a $C_1$ to $C_3$ alkyl group, $R_2$ is a $C_1$ to $C_3$ alkyl group, $R_1+R_2$ is a $C_3$ to $C_5$ alkylene with its valencies in 1,3-relation, $R_3$ is H or a $C_1$ to $C_3$ alkyl group and $R_4$ is H, —$CH_3$, —$C_2H_5$ or —$CH_2OR_3$ have been found to be useful in producing flame resistance on cellulosic materials. The compounds in which each of $R_1$ and $R_2$ is methyl while $R_4$ is hydrogen are novel and afford previously unattained efficiency in producing flame resistance on cellulosic fibers. The compounds in which $R_1$ is a $C_1$ to $C_3$ alkyl group, $R_2$ is a $C_1$ to $C_3$ alkyl group, $R_3$ is H or a $C_1$ to $C_3$ alkyl group, and $R_4$ is $CH_2OR_3$, in which $R_3$ is as defined above, are novel and afford by themselves an effective flame resistance on cellulosic fibers which is outstandingly durable to home laundering.

In these compounds $R_1$ and $R_2$ may be identical, may be different or may in combined form be a $C_3$ to $C_5$ alkylene group having its valencies in 1,3-relation to each other. Thus where $R_3$ is hydrogen and $R_4$ is hydrogen they may include dimethyl-N-(hydroxymethyl) phosphoramidate,
diethyl N-(hydroxymethyl) phosporamidate,
di(n-propyl)N-(hydroxymethyl)phosphoramidate and
diisopropyl N-(hydroxymethyl) phosphoramidate.

Compounds, wherein $R_3$ is $C_1$ to $C_3$ alkyl, include methyl ethers such as dimethyl N-(methoxymethyl) phosphoramidate,
diethyl N-(methoxymethyl) phosphoramidate,
di(n-propyl N-(methoxymethyl) phosphoramidate,
diisopropyl N-(methoxymethyl) phosphoramidate,
methyl isopropyl N-(methoxymethyl) phosphoramidate,
methyl ethyl N-(methoxymethyl) phosphoramidate, and ethyl, n-propyl and isopropyl ethers such as dimethyl N-(ethoxymethyl) phosphoramidate,
diethyl N-(ethoxymethyl) phosphoramidate,
dimethyl N-(isopropoxymethyl) phosporamidate,
diisopropyl N-(isopropoxymethyl) phosphoramidate,
methyl n-propyl N-(ethoxymethyl) phosphoramidate, and
ethyl n-propyl N-(isopropoxymethyl) phosphoramidate.

Preferred among these are dimethyl N-(methoxymethyl) phosphoramidate, diethyl N-(methoxymethyl) phosphoramidate and dimethyl N-(isopropoxymethyl) phosphoramidate.

Cyclic compounds wherein $R_1$ and $R_2$ together are $C_3$ to $C_5$ alkylene are typified, using nomenclature based on Ring System 218 in "The Ring Index," second edition by Patterson, Capell and Walker, copyrighted 1960 by American Chemical Society, by 2-(hydroxymethylamino)-1,3,2-dioxaphosphorinane;
2-(hydroxymethylamino)-4-methyl-1,3,2-dioxaphosphorinane;
2-(hydroxymethylamino)-5-ethyl-1,3,2-dioxaphosphorinane; and
2-(ethoxymethylamino)-1,3,2-dioxaphosphorinane.

The preferred compound is 2-(hydroxymethylamino)-4-methyl-1,3,2-dioxaphosphorinane.

Compounds in which $R_4$ is alkyl include dimethyl N-methyl-N-(hydroxymethyl) phosphoramidate,
diethyl N-methyl-N-(hydroxymethyl) phosphoramidate,
di(n-propyl)N-methyl-N-(hydroxymethyl) phosphoramidate,
dimethyl N-ethyl-N-(hydroxymethyl) phosphoramidate,
dimethyl N- methyl-N-(methoxymethyl) phosphoramidate,
dimethyl N-methyl-N-(propoxymethyl) phosphoramidate,
diethyl N-ethyl-N-(methoxymethyl) phosphoramidate.

Preferred among these are dimethyl N-methyl-N-(hydroxymethyl) phosphoramidate,
diethyl N-methyl-N-(hydroxymethyl) phosphoramidate,
diethyl N-ethyl-N-(ethoxymethyl) phosphoramidate and
dimethyl N-methyl-N-(methoxymethyl) phosphoramidate.

Compounds in which $R_4$ is $CH_2OR_3$ are typified by dimethyl N,N-bis(hydroxymethyl) phosphoramidate;
dimethyl N,N-bis(propoxymethyl) phosphoramidate;
diethyl N,N-bis(hydroxymethyl) phosphoramidate;
methyl n-propyl N,N-bis(hydroxymethyl) phosphoramidate;
dialkyl N-(methoxymethyl)-N-(hydroxymethyl) phosphoramidate; and
diethyl N,N-bis(methoxymethyl) phosphoramidate.

Preferred among these are dimethyl N,N-bis(hydroxymethyl) phosphoramidate and diethyl N,N-bis(methoxymethyl) phosphoramidate.

These compounds can produce fire resistance by their mere presence in cellulosic materials in a sufficient amount. They can also be cured on the cellulosic fiber to render the fire resistance durable to dry cleaning and laundering. In being cured on the fiber they are believed to link chemically with the fiber. Cellulosic fabrics treated with these compounds have a feel which is like that of untreated fabric.

These compounds in which $R_3$ is hydrogen can be prepared by reacting esters of phosphoramidic acid, a known class of compounds, with a compound yielding formaldehyde, such as paraformaldehyde or formaldehyde, according to reaction (I) to produce corresponding N-(hydroxymethyl) derivatives of these esters (I) 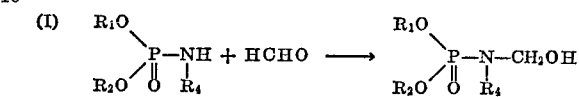

Reaction I proceeds at ordinary temperatures under alkaline, neutral or acidic conditions. The reaction tends to be slow at a pH between 5 and 8. Preferred pH ranges are from about 2 to about 4 and from about 9 to about 11. In cases where $R_4$ is hydroxymethyl or alkoxymethyl, it is preferred to effect Reaction I under alkaline conditions.

The resulting methylol compound can be neutralized for either use or isolation of the methylol compound or the methylol compound can be stored in stable dissolved form at an alkaline pH, such as at pH 10–11. The dimethyl, diethyl, di-(n-propyl) and diisopropyl esters are readily soluble in water and water solutions of these compounds can be diluted any desired degree.

To effect condensation of an N-unsubstituted phosphoramidic ester ($R_4=H$) with two moles of formaldehyde, as in Reaction II below, or of an N-(hydroxymethyl) phosphoramidic ester ($R_4=CHOR$) with an additional mole of formaldehyde, alkaline conditions as strong as pH 10–11 should be used.

(II) 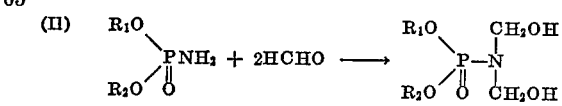

An excess of formaldehyde, usually not over 25%, is needed to cause the complete formation of this bis(hydroxymethyl) derivative.

The resulting N-(hydroxymethyl) derivatives can be converted to corresponding N-(alkoxymethyl) derivatives by reacting the N-(hydroxymethyl) derivatives with an alkanol $R_3OH$ as in Reactions III and IV.

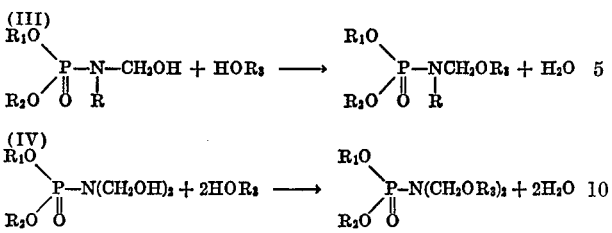

Reactions III and IV can proceed under neutral conditions if an elevated temperature up to 115° C. at autogenous pressure is maintained. However, this reaction readily proceeds at relatively low temperatures. e.g., between −10° C. and +25° C., when the N-(hydroxymethyl) derivative is dissolved in excess alcohol in the presence of hydrogen chloride. The reacted mass can be distilled under reduced pressure to remove unreacted alcohol and water of reaction to leave the N-alkoxymethyl derivative as a product which may be used for flameproofing without further purification.

The resulting alkoxymethyl compounds are stable as such or in neutral solutions. Such compounds are readily water soluble and can form concentrated or dilute water solutions.

Three percent to forty percent, preferably 6 to 18%, of these compounds, based on the weight of the cellulosic substrate is normally required to produce flame retardancy. Dimethyl N-(hydroxymethyl) phosphoramidate is the most effective and in order of lesser efficiency, the methyl, ethyl, n-propyl and isopropyl ethers of dimethyl N-(hydroxymethyl )phosphoramidate perform more efficiently than prior art phosphoramidate compounds.

Dimethyl N-hydroxymethyl phosphoramidate is the most effective and efficient. In lesser efficiency, the other phosphoramidate compounds of this invention perform more efficiently than prior art phosphoramidate compounds. The N,N-bis(hydroxymethyl and alkoxymethyl) derivatives of esters of phosphoramidic acid are outstanding among phosphoramidates of this invention in the durability of their fire retardant effect to dry cleaning and laundering.

The fire resistance these phosphorus compounds produce in cellulosic fibers can be made durable to dry cleaning and laundering if the fibers containing them are heated at curing temperatures in the presence of weakly acidic compounds which are catalysts at those temperatures. At these curing temperatures in the range 150° to 190° C., preferably 160° to 170° C., it is believed these compounds react with cellulosic groups to form a linkage of the general type

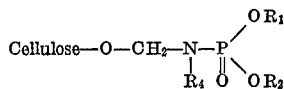

When the compounds used have $R_4=CH_2OR_3$ such compounds are believed to form additional similar linkages with cellulose. In the cured condition fabrics treated with these compounds tend to lose some fire resistance by a first laundering due to loss of phosphorus compound not bound to the fabric, but they lose very little fire resistance due to subsequent launderings.

Suitable catalysts for use in curing our phosphoramidates on cellulosic materials include weakly acidic compounds that do not tender the material, i.e. tend to hydrolize the glycosidic linkages of the cellulosic material at curing temperatures of at least 150° C. and which are relatively involatile at curing temperatures, such as oxalic, tartaric and citric acid and latent acid compounds such as ammonium chloride, ammonium sulfate, ammonium phosphates such as diammonium acid phosphate and acid, addition salts of organic amines, such as 2-methyl-2-aminopropanol-1-hydrochloride, as well as salts of weakly basic metals and strong acids, such as zinc nitrate, zinc chloride and magnesium chloride. Preferred catalysts are ammonium chloride and 2-methyl-2-aminopropanol-1-hydrochloride.

These phosphorus compounds are applied on fabrics by padding on an appropriate amount of their aqueous solutions and drying the fabrics. The amount of compound added is directly proportional to the concentration of solution added and the percentage of solution added to the fabric. Solutions of the compounds may be added by any suitable means, such as by air spraying or airless spraying of solutions on moving fabric in controlled proportions. Preferably the fabric is padded by soaking and nipped by passage through squeezing rollers to control the net amount of solution added on, or picked up, by the fabric. The solution retained and solution squeezed out have essentially the same concentrations of dissolved material.

Drying of the fabric is generally effected by evaporation at temperatures up to about 140° C., conveniently in an oven with continuously circulating hot air.

Where the compounds are to be cured on the fabric, catalyst is included in the aqueous treating solution of the phosphoramidate, in amounts of 1–10%, preferably 2–5%, by weight of phosphoramidate compound used. Fabrics containing our compounds for curing may first be dried at temperatures below the curing temperatures or they may be dried and cured in a single step at curing temperatures.

The frame resistance of the phosphoramidates of this invention is improved and made more durable to dry cleaning and laundering by applying them on cellulosic fabrics in combination with a water soluble aminoplast resin precondensate compound and subsequently drying and curing the fabrics. The stock solution can be made up as a concentrate which can be diluted as needed to make up a solution capable of providing flame resistant properties in cellulosic fabrics. Twenty to six-five parts, preferably 35 to 50 parts, of aminoplast compound should be present for every 35 to 80 parts, preferably 50 to 67 parts, of the N-derivatives of phosphoramidic esters.

The stock solutions may contain dialkyl N-(hydroxymethyl or alkoxymethyl) phosphoramidates in concentrations as high as 80% by weight and aminoplast resin compounds in concentrations as high as 35% by weight. The total amount of these compounds can exceed 80%, but preferably is less than 50% of stock solution weight.

Because the aminoplast resin precondensate compound adds to flameproofing ability of the phosphorus compound and makes flameproofing attained more resistant to dry cleaning and laundering, it is possible to use less of the phosphorus compound. In some cases as little as 6% of the phosphorus compound can be added onto the fabric when an equal weight of the precondensate compound is also used.

Water-soluble aminoplast resin precondensate compounds useful for the stock solution are all compounds containing at least two moles of condensed formaldehyde as N-hydroxymethyl or etherified N-hydroxymethyl groups. Such compounds contain condensed formaldehyde as methylol (—$CH_2OH$) groups or as etherified methylol groups ($CH_2O$ alkyl) where the etherifying alcohol is $C_1$ to $C_4$ saturated alcohol.

Precondensate compounds may include polymethylol derivatives, as well as their partial or complete ethers of amides such as urea, thiourea, guanidine and dicyandiamide. Particular examples of these include dimethylolurea, tetramethylol urea, di-(methoxymethyl) urea, dimethylolguanidine, trimethylol guanidine and dimethyloldicyandiamide.

Precondensate compounds of substituted ureas may also be used, such as formaldehyde condensates and their ethers from ethylene urea, methyleneurea, acetylenediurea, biuret, uron (oxydimethyleneurea) and triazone (iminodimethyleneurea). Particular examples of these include dimethylolethyleneurea, dimethylolmethyleneurea, tetramethylolacetylenediurea, trimethylolbiuret, di(methoxymethyl)uron and di(methoxymethyl)triazone.

Likewise there can be used the reaction products of formaldehyde with triazines such as melamine, diaminotriazine, formoguanamine and 2-chloro-4,6-diaminotriazine. Particular examples of such precondensates include di- and trimethylolmelamine, optionally partly methylated, hexa(methoxymethyl) melamine, tetramethyloldiaminotriazine and tetramethylol-2-chloro-4,6-diaminotriazine.

Diazines and azoles are also base compounds for useful aminoplast resin precondensate compounds. Typical of these are precondensates based on 2,4-diamino-1,3-diazine, guanazole or diaminopyrrole.

A catalyst is required to cure the phosphoramidate and resin compound on the fabric so that the flameproofing effect is durable to dry cleaning and laundering. The catalysts useful to cure the phosphoramidates alone on the fabric are also useful to cure the phosphoramidate-resin combination on the fabric. Catalyst is dissolved in the flameproofing solution before its application on the fabric. Again the amount of catalyst used is in the range 1 to 10%, preferably 2–5%, of the combined content of phosphoramidate and resin compound used.

The flameproofing procedure for the use of stock solution of phosphoramidate and resin compound is to form a solution of the stock solution, diluted if desired, containing dissolved catalyst. Even with catalyst added the treating solution is stable for long periods of time. The solution is applied to cellulosic material by air-driven or airless spray or by padding to a precalculated pickup of the components of the solution. The material is then dried at temperatures up to 140° C., preferably up to 115° C., and the dried material is cured at 150° to 190° C., preferably at 160–180° C. Optionally drying and curing may be effected together at the curing temperature.

Scouring the heat treated fabric once by treating it with a liquid medium which removes unbound flameproofing material reduces its fire resistance slightly. However, that slightly reduced fire resistance remains essentially unchanged by many dry cleaning or laundering treatments thereafter.

In most cases any loss of a soft feel or hand present in untreated fabric is difficult to detect in the flameproofed fabric.

Phosphoramidates in this invention and their combinations with aminoplast resin precondensate compounds are particularly effective on cellulosic material of a fibrous nature. In the textile field this includes cotton, the preferred fiber, linen, viscose rayon, cuprammonium rayon, jute, hemp and ramie. Such cellulosic material may be flameproofed in the form of raw fiber, carded stock, rovings, thread, yarn and felts as well as in the form of knitted and woven fabrics. Paper is a felt which may be flameproofed. However, cellulosic material need not be fibrous to be fireproofed by this invention if it can be penetrated by water or swollen so as to be able to receive aqueous flameproofing solutions.

Fibrous cellulosic material receives flameproofing benefit from these compositions even though blended with other fibers such as natural animal fibers like wool and synthetic fibers such as linear polyamide, linear polyester and polymeric acrylic fibers.

Cellulosic materials fireproofed according to this invention are safer for use in tents, stage scenery, upholstery fabrics, slipcovers, draperies, wearing apparel for personnel in close contact with fire or heat, bedding, nightclothes, tarpaulins, insulation, padding, rope, string and twine. The weight of fabrics treated to attain flameproof properties is not important. Since our flameproofing components completely penetrate fabric material, the fabric is flameproofed throughout.

Flameproofing compositions of this invention are easily prepared without isolation of the hydroxymethyl compounds by contacting a phosphoramidic acid ester with at least a molar proportion of formaldehyde in an alkaline aqueous solution, preferably at pH 9 to 11, or in an acidic aqueous solution, such as at pH 2 to 4, preferably about pH 2, and then neutralizing the solution to about pH 7 (e.g. ±0.5) when the formation of the corresponding N-(hydroxymethyl) phosphoramidic acid ester has occurred to the desired extent. Where an N,N-bis(hydroxymethyl) derivative is prepared from an N-unsubstituted phosphoramidic ester at least two molar proportions of formaldehyde are used at a solution pH of 10 to 11. Neutralized solutions of unisolated N,N-bis(hydroxymethyl) derivatives can be used directly as flameproofing compositions with or without dissolved curing catalysts. These solutions may be prepared in a form suited to storage and shipping by adjusting their pH, where necessary, to about 10 to 11. The alkaline solutions may then be neutralized at their time of use as flameproofing compositions.

Water-soluble aminoplast resin condensate compound can be added to this solution, optionally with some dilution by water, to produce stock solution for a flameproofing composition containing the resin. At any time they may be diluted and catalyst added to them for flameproofing use. Nonionic wetting agents may be incorporated in flameproofing compositions to accelerate the wetting of cellulosic material treated by these compositions. Such a wetting agent is normally a poly(oxyethylene)ether, such as a phenol, monohydric aliphatic alcohol or polyhydric aliphatic alcohol which has been polyoxyethylated with ethylene oxide, for instance polyoxyethylated phenol. Such wetting agents can be at concentrations of 0.01 to 0.15% weight of flameproofing solutions.

EXAMPLES

In the following examples parts where used are weight parts except where otherwise specified. The terms padding, scouring, laundering, limiting oxygen index, vertical flame test and char length used herein and elsewhere in this disclosure have meanings as follows:

Padding.—Wetting fabric with the solution to be applied and then running the wet fabric between rollers to squeeze out liquid which is in excess of the desired net add-on or pickup on the fabric.

Scouring.—Agitating fabric in an aqueous solution containing 0.1% sodium bicarbonate and 0.03% of the sodium salt of the sulfate ester of 55% lauryl alcohol and 45% oleyl alcohol.

Laundering (also expressed as home washing).—Exposing fabric to a standard laundering cycle, starting with a washing solution of 100 grams of commercial "Tide" detergent per 15 gallons of water.

Dry cleaning.—A cycle which consists of tumbling a 5-inch square piece of fabric in 100 ml. of tetrachloroethylene containing 1% Streit's dry cleaning detergent (an alkyl sulfonate compound) for 30 minutes, draining the tetrachloroethylene, rinsing the fabric with 100 ml. of pure tetrachloroethylene and allowing the rinsed fabric to dry.

Limiting Oxygen Index (LOI).—Determined with a 5-inch by 2-inch piece of fabric spread lengthwise in a vertical plane and supported along its vertical edges. The spread fabric is positioned inside a transparent circular column open only at the top. The top of the column is one or more inches above the spread fabric. The interior of the column is provided with an upward flow from its base of a gaseous mixture of pure oxygen and pure nitrogen. The volume flow rate of each gas making up the mixture is instrumented and manually adjustable. To test fabric in this apparatus the spread fabric is ignited from the top while gas mixture flows up the column. The flow rates of the nitrogen and oxygen are adjusted until the flame on the ignited fabric just goes out. The ratio of the volume flow of oxygen to the sum of the volume flows of oxygen and nitrogen is then figured. This value, called the Limiting Oxygen Index or LOI, is the average of two determinations.

As a standard of reference untreated 8 oz. cotton twill used in the following examples to test the effectiveness of the various flameproofing agents has an LOI value of 0.180±0.002 and is completely burned up in the vertical flame test. Air contains about 21 mole percent oxygen, therefore fabrics with LOI values below about 0.210 can be expected to burn freely in a candlelike manner (from top down) in normal air and those with LOI values exceeding 0.210 to burn less freely in normal air. For commercial applications a minimum LOI value in the range 0.260 to 0.280 is acceptable.

The vertical flame test is carried out in a 12-inch by 12-inch cabinet 30 inches high, having a glass front. Gas circulation is provided by a 4-inch high opening beneath the glass front and a 6 inch diameter baffled hole at the top of the cabinet. It is provided with holder brackets in which a specimen holder is hung. The specimen holder provides a vertical (2-inch wide) open space 14 inches high and vertical side clips to hold edges of fabric which span this open space. Samples are ignited by a 6-inch high Bunsen burner having a ⅜-inch inside diameter tube, while the luminous flame is 1½ inches long.

To conduct the test a 2¾-inch by 10-inch fabric sample is held in the specimen holder by its vertical edges and the specimen holder is hung centrally by the holder brackets. The igniting flame is applied so that ¾ inch of the lower end of the fabric is in the flame. This exposure is continued for 12.0 seconds and the flame is removed. After the fabric has extinguished itself the sample is removed from the holder and set down. A hook with an attached weight is inserted in the sample on one side of the charred area ¼ inch from the outside edge and ¼ inch from the lower edge. For 2.0 to 6.0 oz. per square yard fabric the weight is 0.25 pound; for over 6.0 to 15 oz. per square yard fabric a 0.50 pound weight is used. The corner of the cloth at the opposite edge of the char from the load is gently raised until the sample and weight are clear of supporting surface. The length of the tear which occurs is measured and reported as char length. Where char length is reported it is understood to have been determined by this procedure and to be an average value of 2 to 4 determinations.

EXAMPLE I

Dimethyl N-(hydroxymethyl) phosphoramidate

Dimethyl phosphoramidate (200 parts, 1.6 moles) was added to aqueous 37% formaldehyde solution (143 parts, 1.76 moles) and the pH of the resulting solution was adjusted to 10 with 20% aqueous sodium hydroxide. This mixture was allowed to stand for 2 hours at room temperature.

The solution was adjusted to pH 7.0 by adding concentrated hydrochloric acid, resulting in 344 parts of a 72% solution of dimethyl N-(hydroxymethyl) phosphoramidate. This solution is usable directly in preparing flameproofing compositions. It is stable for at least a month.

The product was isolated by removing water under vacuum at 50° C. and filtering the resulting colorless liquid to remove sodium chloride. Elemental analyses gave the following results: P=21.0%; N=8.90%; C=23.8%; H=6.4%. $C_3H_{10}O_4NP$ requires P=20.0%; N=9.0%; C=23.2%; H=6.4%. The infrared and proton NMR spectra were consistent with the hydroxymethyl compound.

Diethyl N-(hydroxymethyl) phosphoramidate was readily made by the same procedure in which, however, 245 parts diethyl phosphoramidate was used in place of the dimethyl phosphoramidate.

EXAMPLE II

Dimethyl N-(methoxymethyl) phosphoramidate

Dimethyl N-(hydroxymethyl) phosphoramidate (31.0 parts, 0.2 mole) was dissolved in methanol (128 parts) and the solution was cooled to 8° C. While the solution was held at 8° with cooling, anhydrous hydrogen chloride gas to solution saturation was passed into it. The solution was stirred 30 minutes and then allowed to warm up to 30° C. Solid sodium bicarbonate was added until the solution was neutral.

The solution was filtered and methanol was removed from the filtrate by vacuum distillation. The residue was extracted with ethyl acetate, the extract was filtered and solvent was vacuum distilled from the filtrate. A colorless liquid was obtained, the NMR spectrum of which was consistent with that expected for dimethyl N-(methoxymethy) phosphoramidate.

In a similar procedure diethyl N-(ethoxymethyl) phosphoramidate is made using 36.6 parts diethyl N-hydroxymethyl) phosphoramidate in place of dimethyl N-(hydroxymethyl) phosphoramidate and 195 parts ethanol, denatured formula 2B, instead of methanol. The product is identifiable by its NMR spectrum as having the expected structure of diethyl-N-(ethoxymethyl) phosphoramidate.

EXAMPLES III–VI

Flameproofing effectiveness of $(RO)_2P(=O)NHCH_2OH$

Aqueous solutions containing compounds of the formula $(RO)_2P(=O)NHCH_2OH$, all made by the method of Example 1, in which R is $CH_3$, $C_2H_5$, n-$C_3H_7$ and iso $C_3H_7$ were prepared in which the compounds ranged in concentration from 5% to 40%.

Samples of bleached, mercerized cotton twill fabric (8 oz./sq. yd.) were padded with these solutions to about 80% solution pickup. The treated fabrics were dried at 115° C. for 15 minutes. Add-on of a compound was calculated from the analysis of the dried fabric for phosphorus content. All fabrics treated had a soft feel. Flammability of the treated fabrics, as L.O.I., was determined against calculated compound add-ons. Results are shown in Table I. The table is shown graphically in the figure which relates the L.O.I. of treated fabric to the amount of a compound added-on the fiber.

EXAMPLE VII

Eight-ounce cotton twill fabrics were padded to an about 77% solution pickup of aqueous solutions containing 5–45% diallyl N-(hydroxymethyl) phosphoramidate prepared as in Examples III and IV of U.S. 2,574,516. The padded fabrics were dried 15 min. at 115° C. and, after cooling, tested for flameproofing efficiency and analyzed for phosphorus content. Results are shown in Table I and are graphed on the figure.

EXAMPLE VIII

Eight-ounce cotton twill fabrics were padded to an about 77% pickup of dimethylformamide solutions containing 8–40% bis(2,3 - dibromopropyl) N - (hydroxymethyl) phosphoramidate prepared according to Example II of British Patent 700,455. This compound was not water-soluble. The padded fabrics were dried 15 minutes at 115° C. The dried fabric exhibited a damp, clammy feel which contrasted with the soft dry feel of fabrics treated with the compounds of our invention. After cooling, the fabrics were tested for flameproofing efficiency and analyzed for phosphorus content. Results are shown in Table I and are graphed on the figure.

EXAMPLE IX

Treating solutions containing 4–32% of dimethyl N-(methoxymethyl) phosphoramidate in water were padded on 8-oz. cotton twill fabrics. The fabrics were dried 14 minutes at 110° C. Add-ons shown in Table I are based on phosphorus analysis. The flame resistance of each sample was measured and is shown in Table I. An efficiency graph of this example is shown in the figure.

TABLE I

| Ex. | Compound | Tests | Sample designation | | | | | | | | | |
|---|---|---|---|---|---|---|---|---|---|---|---|---|
| | | | A | B | C | D | E | F | G | H | I | J |
| III | $(CH_3O)_2\underset{\underset{O}{\|}}{P}NHCH_2OH$ | Percent P o.w.f. | 0.72 | 1.34 | 1.88 | 2.29 | 2.48 | 2.84 | 3.14 | 3.73 | 4.13 | 5.43 |
| | | Percent Add-on o.w.f. | 3.6 | 6.7 | 9.4 | 11.5 | 12.4 | 14.2 | 15.7 | 18.7 | 20.7 | 27.2 |
| | | LOI | 0.221 | 0.251 | 0.274 | 0.289 | 0.301 | 0.314 | 0.319 | 0.327 | 0.333 | 0.34 |
| IV | $(C_2H_5O)_2\underset{\underset{O}{\|}}{P}NHCH_2OH$ | Percent P o.w.f. | 0.61 | 0.17 | 1.45 | 1.93 | 2.03 | 2.50 | 3.21 | 3.45 | 4.89 | |
| | | Percent Add-on o.w.f. | 3.6 | 6.9 | 8.6 | 11.4 | 12.0 | 14.8 | 19.0 | 20.4 | 28.9 | |
| | | LOI | 0.207 | 0.238 | 0.299 | 0.261 | 0.266 | 0.274 | 0.282 | 0.285 | 0.289 | |
| V | $(n\text{-}C_3H_7O)_2\underset{\underset{O}{\|}}{P}NHCH_2OH$ | Percent P o.w.f. | 0.52 | 1.17 | 1.25 | 1.65 | 1.72 | 2.05 | 2.54 | 2.87 | 4.07 | |
| | | Percent Add-on o.w.f. | 3.5 | 7.9 | 8.5 | 11.2 | 11.7 | 13.9 | 17.4 | 19.5 | 27.6 | |
| | | LOI | 0.202 | 0.233 | 0.237 | 0.247 | 0.249 | 0.256 | 0.263 | 0.268 | 0.273 | |
| VI | $(i\text{-}C_3H_7O)_2\underset{\underset{O}{\|}}{P}NHCH_2OH$ | Percent P o.w.f. | 0.49 | 1.10 | 1.21 | 1.52 | 1.73 | 1.98 | 2.34 | 2.93 | 2.99 | 4.06 |
| | | Percent Add-on o.w.f. | 3.4 | 7.4 | 8.2 | 10.3 | 11.8 | 13.3 | 15.9 | 19.9 | 20.3 | 27.6 |
| | | LOI | 0.199 | 0.225 | 0.233 | 0.243 | 0.247 | 0.254 | 0.260 | 0.262 | 0.261 | 0.264 |
| VII | $(CH_2=CHCH_2O)_2\underset{\underset{O}{\|}}{P}NHCH_2OH$ | Percent P o.w.f. | 0.52 | 0.01 | 1.40 | 1.76 | 2.06 | 2.46 | 2.50 | 3.14 | 3.24 | 3.79 |
| | | Percent Add-on o.w.f. | 3.6 | 7.2 | 10.3 | 13.3 | 16.0 | 19.7 | 20.0 | 26.6 | 27.7 | 20.0 |
| | | LOI | 0.196 | 0.225 | 0.240 | 0.250 | 0.256 | 0.262 | 0.260 | 0.262 | 0.262 | 0.260 |
| VIII | $(CH_2BrCHBrCH_2O)_2\underset{\underset{O}{\|}}{P}NHCH_2OH$ | Percent P o.w.f. | 0.30 | 0.54 | 0.72 | 1.00 | 1.15 | 1.30 | 1.50 | | | |
| | | Percent Add-on o.w.f. | 5.3 | 10.2 | 14.0 | 20.3 | 24.2 | 30.0 | 35.3 | | | |
| | | LOI | 0.198 | 0.223 | 0.241 | 0.255 | 0.275 | 0.283 | 0.301 | | | |
| IX | $(CH_3O)_2\underset{\underset{O}{\|}}{P}NHCH_2OCH_3$ | Percent P o.w.f. | | | | | | | | | | |
| | | Percent Add-on o.w.f. | 2.8 | 5.8 | 8.5 | 12.2 | 13.8 | 17.0 | 20.1 | 25.0 | | |
| | | LOI | 0.212 | 0.241 | 0.268 | 0.281 | 0.305 | 0.306 | 0.325 | 0.330 | | |

NOTE.—Po.w.f.=on weight fiber.

Examination of the figure clearly shows:

(1) The clear superiority of dimethyl N-hydroxymethyl phosphoramidate in flameproofing efficiency and attainable flameproofing over prior art N-(hydroxymethyl) phosphoramidates;

(2) The superiority of the ethyl and propyl esters over the allyl esters in both efficiency and attainable flameproofing; and (3) The superiority of the ethyl and n-propyl esters over the dibromopropyl esters in their efficiency in the practical degrees of flameproof performance normally required for commercial performance while retaining a desirable hand in fabrics treated with them which is not provided by the dibromopropyl ester.

EXAMPLE X

N-methylolated vs. unmethylolated phosphoramidates (A) Di(n-propyl) phosphoramidate (8.24 parts, 0.045 mole) was dissolved in 37% aqueous formalin (4.0 parts, 0.049 mole) adjusted to pH 10 by adding 20% aqueous sodium hydroxide and allowed to stand at room temperature for 2 hours. The pH was adjusted to 7.0 by the addition of concentrated aqueous hydrochloric acid, and 4.0 parts trimethylol melamine, 0.2 part ammonium chloride and 24.5 parts water were added to make a padding solution.

(B) A second solution was made from di(n-propyl) phosphoramidate (8.24 parts), 4.0 parts trimethylol melamine, 0.2 part ammonium chloride and 28.5 parts water.

Samples of bleached, mercerized cotton twill fabric weighing 8 oz. per square yard were padded with these solutions to 87% add-on. The treated fabrics were dried and cured by exposure for 6 minutes in a hot oven circulating 150° C. air. Flammability tests before and after laundering are shown below.

TABLE II

| LOI value | Test designation | |
|---|---|---|
| | A | B |
| Before scour | 0.291 | 0.290 |
| After 1 Home Wash | 0.270 | 0.246 |
| After 10 HW | 0.261 | 0.232 |

As can be seen, the fire resistance from the composition with methylolated phosphoramidate has superior resistance to laundering.

EXAMPLE XI

Dimethyl ester + trimethylol melamine

A water solution containing 10% dimethyl N-(hydroxymethyl) phosphoramidate, 8% trimethylol melamine and 0.5% ammonium chloride was padded on a bleached, cotton flannelette fabric weighing about 4 oz. per square yard to a 140% add-on. The treated fabric was dried at 140° C., cured for 4 minutes in a hot oven circulating air at 170° C., scoured and laundered.

Fire resistance was as follows.

TABLE III

| Fabric: | LOI value |
|---|---|
| Before scour | 0.285 |
| After 1 Home Wash | 0.267 |
| After 20 Home Washes | 0.262 |

EXAMPLE XII

Wash fastness of diethyl phosphoramidate vs. N-(hydroxymethyl) derivative with and without trimethylol melamine Water solutions were prepared containing the following parts of component per 100 parts solution.

TABLE IV

| Component | Sample designation | | | | | | | | | |
|---|---|---|---|---|---|---|---|---|---|---|
| | A | B | C | D | E | F | G | H | I | J |
| Diethyl phosphoramidate | | | | | | 20 | 20 | 20 | 20 | 20 |
| Diethyl N-(hydroxymethyl) phosphoramidate | 24 | 24 | 24 | 24 | 24 | | | | | |
| Trimethylol melamine | 0 | 8 | 12 | 16 | 20 | 0 | 8 | 12 | 16 | 20 |
| Ammonium chloride | 0.5 | 0.5 | 0.5 | 0.5 | 0.5 | 0.5 | 0.5 | 0.5 | 0.5 | 0.5 |

The amounts of phosphorus compounds used were on an equivalent phosphorus basis.

Samples of bleached, mercerized cotton twill fabric were padded with these solutions to a net add-on of about 80%. The fabrics were dried for 8 minutes at 115° C. and then exposed to circulation 175° C. air for 3 minutes. Portions of each sample were subjected to one home washing and to 20 home washings. Flammability and phosphorus and nitrogen content of the treated fabrics was determined. Results are listed in Table V.

Samples of bleached, mercerized cotton twill fabric were padded in the solutions to about 80% add-on. The

TABLE V

| Test | Sample designation | | | | | | | | | |
|---|---|---|---|---|---|---|---|---|---|---|
| | A | B | C | D | E | F | G | H | I | J |
| LOI: | | | | | | | | | | |
| Initial | 0.262 | 0.300 | 0.309 | 0.321 | 0.335 | 0.243 | 0.289 | 0.312 | 0.335 | 0.349 |
| 1 Home wash | 0.210 | 0.276 | 0.292 | 0.312 | 0.326 | 0.166 | 0.233 | 0.262 | 0.294 | 0.318 |
| 20 Home washes | 0.203 | 0.272 | 0.291 | 0.309 | 0.321 | 0.165 | 0.224 | 0.258 | 0.285 | 0.303 |
| Percent P: | | | | | | | | | | |
| Initial | 2.22 | 2.13 | 2.20 | 2.33 | 2.60 | 1.42 | 1.78 | 1.83 | 2.01 | 2.19 |
| 20 HW | 0.68 | 1.57 | 1.63 | 1.82 | 1.98 | 0.09 | 0.57 | 0.88 | 1.06 | 1.33 |
| Percent N: | | | | | | | | | | |
| Initial | 0.94 | 3.25 | 4.16 | 5.16 | 6.35 | 0.52 | 3.03 | 4.30 | 5.16 | 6.30 |
| 20 HW | 0.28 | 3.25 | 3.93 | 4.82 | 5.98 | 0.05 | 2.23 | 3.66 | 4.76 | 5.85 |

As can be seen, the wash fastness of the fire resisting effect of the N-(hydroxymethyl) derivative is superior. Concurrent with this superior wash fastness is a much superior retention of phosphorus.

EXAMPLE XIII

Contrasting trimethylol melamine alone with Example XIV

Water solutions were prepared containing the following parts of component per 100 parts solution.

| Component | Sample designation | | | |
|---|---|---|---|---|
| | A | B | C | D |
| Trimethylol melamine | 8 | 12 | 16 | 20 |
| Ammonium chloride | 0.5 | 0.5 | 0.5 | 0.5 |

8-ounce cotton twill fabrics were padded with these solutions to a 77% pickup. Fabrics were dried 8 minutes at 115° C. and then exposed to circulating 175° C. air for 3 minutes. Parts of the samples were subjected to one home washing. Flammability of the fabrics as initially treated and after one home washing is shown as follows.

| Test | Sample designation | | | |
|---|---|---|---|---|
| | A | B | C | D |
| LOI: | | | | |
| Initial | 0.193 | 0.196 | 0.204 | 0.209 |
| 1 Home wash | 0.189 | 0.192 | 0.195 | 0.204 |

EXAMPLE XIV

Dimethyl ester with and without trimethylol melamine

Water solutions were prepared containing the following parts of component per 100 parts of solution.

TABLE VI

| Component | Sample designation | | | |
|---|---|---|---|---|
| | A | B | C | D |
| Dimethyl N-(hydroxymethyl) phosphoramidate | 25 | 25 | 25 | 25 |
| Trimethylol melamine | 0 | 7.6 | 10 | 15 |
| Ammonium chloride | 0.5 | 0.5 | 0.5 | 0.5 | fabrics were dried at 100° C. and exposed 3 minutes in a hot oven circulating air at 180° C. Fabrics were scoured and portions of each were homewashed once, five and ten times. The flammability of portions at the various stages is shown in Table VII.

TABLE VII

| LOI by test | Sample designation | | | |
|---|---|---|---|---|
| | A | B | C | D |
| Before scour | 0.283 | 0.321 | 0.336 | 0.347 |
| After 1 Home wash | 0.245 | 0.304 | 0.327 | 0.333 |
| After 5 HW | 0.236 | 0.294 | 0.317 | 0.326 |
| After 10 HW | 0.234 | 0.290 | 0.308 | 0.322 |

This example emphasizes that, although cure fixes the phosphorus compound on the fiber in wash resistant fire retardant effect, resin improves the fixation of the phosphorus compound on the fiber.

EXAMPLE XV

Dimethyl ester, methyl ether with and without resin

Water solution were prepared containing the following parts per hundred parts of solution.

TABLE VIII

| Component | Test designation | |
|---|---|---|
| | A | B |
| Dimethyl N-(methoxymethyl) phosphoramidate | 24 | 14 |
| Trimethylol melamine | 0 | 6 |
| Ammonium chloride | 0.5 | 0.5 |

Samples of bleached, mercerized cotton twill fabric weighing 8 oz. per square yard were padded with these solutions. The treated fabrics were dried at 95° C. and cured for 4 minutes at 165° C. The samples were scoured and portions of each were laundered once and 20 times. Flammability tests and phosphorus and nitrogen analyses of treated fabrics are shown.

TABLE IX

| Test designation | LOI values | | | Percent P | | Percent N | |
|---|---|---|---|---|---|---|---|
| | Before scour | After one Home Wash | After 20 HW | Before scour | After 20 HW | Before scour | After 20 HW |
| A | 0.405 | 0.320 | 0.310 | 6.41 | 3.66 | 1.76 | 0.42 |
| B | 0.383 | 0.277 | 0.280 | 3.51 | 2.29 | 3.18 | 0.54 |

EXAMPLE XVI

Non-equivalency of prior processes of use of phosphoramidates and formaldehyde

Water solutions were made from the following components described as parts per hundred of solution.

TABLE X

| | Components into solution | | | | | |
|---|---|---|---|---|---|---|
| Sample | $(OC_2H_5)_2$ $P=O$ $\|$ $NH_2$ | $(OC_2H_5)_2$ $P=O$ $\|$ $NHCH_2OH$ | Formalin 37% soln. | Melamine | Trimethylol Melamine | Ammonium chloride |
| A | 31.8 | | 27.4 | 5.9 | | |
| B | | 38.0 | | | 10.0 | 2.8 |
| C | 33.2 | | 26.1 | 4.5 | | |
| D | | 39.8 | | | 7.8 | 3.0 |

Samples A and C corresponded in weight proportions to Examples 1 and 3, respectively, of British 835,581 and were made by the same sequence of times and heating as those examples. Samples B and D used phosphorus compounds and trimethylol melamine in molar amounts equal to phosphorus compound and melamine in Samples A and C, respectively, and they were made by simply mixing the components in water.

Cotton twill fabric samples were padded with each solution to a net add-on of 80%. They were dried 10 minutes at 100° C. and cured 4 minutes at 165° C. The fabrics were scoured and laundered 20 times. Evaluation of flammability and hand of the treated fabrics are shown in Table XI.

TABLE XI

| | LIO value | | |
|---|---|---|---|
| Sample | After scour | After 20 home washes | Hand |
| A | 0.301 | 0.298 | Stiff and boardy. |
| B | 0.314 | 0.304 | Soft, hard to distinguish from untreated fabric. |
| C | 0.294 | 0.290 | Stiff and boardy. |
| D | 0.300 | 0.293 | Soft, as in B. |

Though the finishes from the unmethylolated phosphoramidates had about equivalent fire retardancy performance they were very inferior in feel of the treated fabric.

EXAMPLE XVII

Diethyl ester—Trimethylol melamine

Water solutions were prepared containing the following parts of component per 100 parts of solution.

TABLE XII

| | Sample designation | | | | | | | |
|---|---|---|---|---|---|---|---|---|
| Component | A | B | C | D | E | F | G | H |
| Diethyl N-(hydroxymethyl) phosphoramidate | 16 | 14 | 12 | 10 | 16 | 14 | 12 | 10 |
| Trimethylol melamine | 10 | 10 | 10 | 10 | 8 | 8 | 8 | 8 |
| Ammonium chloride | 0.5 | 0.5 | 0.5 | 0.5 | 0.5 | 0.5 | 0.5 | 0.5 |

Pieces of bleached, mercerized cotton twill fabric were padded in these solutions to a net solution add-on of about 85%. Fabrics were dried at 95° C. and exposed 4.5 minutes in a hot oven circulating air at 165° C. The fabrics were scoured and rinsed, some portions being also laundered once and some portions being laundred twenty times. At various stages the fabrics were tested for fireproof properties by LOI and by vertical flame test and for phosphorous and nitrogen content. Results are shown in Table XIII.

TABLE XIII

| | Sample designation | | | | | | | |
|---|---|---|---|---|---|---|---|---|
| Fabric test | A | B | C | D | E | F | G | H |
| LOI: | | | | | | | | |
| Before scour | 0.311 | 0.303 | 0.284 | 0.286 | 0.300 | 0.288 | 0.282 | 0.276 |
| After one Home Wash | 0.296 | 0.287 | 0.278 | 0.272 | 0.275 | 0.275 | 0.275 | 0.258 |
| After 20 Home washes | 0.291 | 0.282 | 0.274 | 0.268 | 0.275 | 0.270 | 0.267 | 0.254 |
| Char length, in.: | | | | | | | | |
| Before scour | 3.9 | 3.8 | 3.6 | 4.2 | 3.5 | 4.0 | 4.2 | 4.6 |
| After 1 HW | 3.1 | 2.4 | 3.7 | 3.6 | 3.8 | 3.8 | 4.0 | 6.2 |
| After 20 HW | 3.1 | 3.4 | 3.7 | 6.6 | 4.0 | 4.1 | 4.5 | 5.0 |
| Percent P: | | | | | | | | |
| Before scour | 2.01 | 1.71 | 1.42 | 1.40 | 2.07 | 1.83 | 1.49 | 1.35 |
| After 20 HW | 1.47 | 1.31 | 1.22 | 1.01 | 1.62 | 1.81 | 1.17 | 1.00 |
| Percent N: | | | | | | | | |
| Before scour | 4.38 | 4.10 | 4.17 | 4.21 | 3.73 | 3.43 | 3.58 | 3.66 |
| After 20 HW | 3.91 | 3.60 | 3.51 | 3.82 | 3.21 | 3.22 | 2.04 | 3.03 |

EXAMPLE XVIII

Diethyl ester with resin

A water solution was prepared containing the following parts per hundred of solution.

Component
- Diethyl N-(hydroxymethyl)phosphoramidate — 20
- 2-Methyl-2-amino-1-propanol hydrochloride — 0.5
- Trimethylol melamine — 8
- Polyoxyethylated phenol — 0.05

A sample of bleached, mercerized cotton twill fabric weighing 8 oz. per square yard was padded with this solution to a net add on of 87%. The treated fabric dried at 95° C. and cured 4 minutes in an oven circulating 165° C. air. Flammability by LOI and by vertical flame test before and after laundering is shown below.

TABLE XIV

| Fabric stage | LOI | Char length, in. |
|---|---|---|
| Before scour | 0.307 | 3.7 |
| After one HW | 0.300 | 3.9 |
| After 20 HW | 0.300 | 3.5 |

EXAMPLE XIX

Diethyl ester on varied cellulosics

In a water solution containing 20% diethyl N-(hydroxymethyl) phosphoramidate, 10% trimethylol melamine and 0.5% ammonium chloride five fabric samples were padded to add-ons of 62 to 114%. The fabrics were (A)—8-ob. cotton twill
(B)—4-oz. flannelette
(C)—3.5-oz. cotton broadcloth
(D)—3.2-oz. cotton print
(E)—4-oz. rayon challis These fabrics were passed at two yards per minute between banks of infrared lamps placed so that a 1000-watt lamp shined on each surface at three inches away and perpendicular to the surface. The continuously moving fabrics were then passed through a circulating air oven at 110–120° C., the oven-occupancy time for each segment of the fabric being one minute. The fabrics were then passed through an oven at 170–180° C. with an occupancy time of 1.7 minutes. Flammability by LOI and vertical flame test analyses of the treated samples are shown in Table XV.

TABLE XV

| Test | Sample designation | | | | |
|---|---|---|---|---|---|
| | A | B | C | D | E |
| LOI: | | | | | |
| Before scour | 0.314 | 0.316 | 0.305 | 0.314 | 0.308 |
| After scour | 0.296 | 0.309 | 0.298 | 0.307 | 0.296 |
| After 10 Home Washes | 0.286 | 0.304 | 0.288 | 0.299 | 0.280 |
| After 20 HW | 0.276 | 0.301 | 0.286 | 0.297 | 0.265 |
| Char length, inches: | | | | | |
| Before scour | 4.0 | 3.2 | 3.7 | 3.3 | 3.8 |
| After 20 HW | 4.5 | 3.7 | 3.2 | 4.4 | (¹) |
| Percent P: | | | | | |
| Before scour | 2.24 | 3.65 | 2.41 | 3.16 | 3.80 |
| After 20 HW | 1.26 | 2.03 | 1.50 | 1.83 | 2.28 |

¹ Completely burned.

EXAMPLE XX

Diethyl ester with resin variations

Cotton twill fabrics were padded to about 85% add-on of a water solution containing 24% diethyl N-(hydroxymethyl) phosphoramidate, 0.5% ammonium chloride and 10% of one of the resins as designated below. Resins are on an equal solids weight basis.

TABLE XVI

| Sample designation | Resin tradename | Resin type |
|---|---|---|
| A | "Resloom" HP | Trimethylol melamine. |
| B | "Aerotex" M-W | } Etherified methylol melamine. |
| C | "Aerotex" M-3 | |
| D | "Cymel" 300 | Hexamethoxymethyl melamine. |
| E | "Aerotex" 23-special | Formaldehyde uron/melamine condensate. |
| F | | None. |

The fabrics were dried, cured and scoured. Flammability and analytical test data are shown in Table XVII.

TABLE XVII

| Test | Sample designation | | | | | |
|---|---|---|---|---|---|---|
| | A | B | C | D | E | F |
| LOI: | | | | | | |
| Before scour | 0.318 | 0.295 | 0.307 | 0.282 | 0.277 | 0.267 |
| After 1 Home Wash | 0.311 | 0.282 | 0.310 | 0.275 | 0.264 | 0.215 |
| After 20 HW | 0.309 | 0.271 | 0.279 | 0.268 | 0.250 | 0.209 |
| Percent P: | | | | | | |
| Before scour | 2.58 | 2.61 | 2.45 | 2.21 | 2.15 | 2.26 |
| After 20 HW | 1.76 | 1.66 | 1.48 | 1.86 | 1.38 | 0.88 |
| Percent N: | | | | | | |
| Before scour | 4.26 | 3.00 | 3.54 | 2.94 | 2.79 | 1.03 |
| After 20 HW | 3.79 | 2.44 | 3.34 | 2.60 | 2.35 | 0.32 |

In all cases, the coapplication of resin with phosphorus compound contributed added flame retardancy, and reduced wash-off of both flame retardancy effect and phosphorus content by laundering.

EXAMPLE XXI

Diethyl ester with varied resins

Cotton twill fabric was padded to a wet pickup of about 77% water solution containing, per hundred parts of solution, 25 parts diethyl N-(hydroxymethyl) phosphoramidate, 0.6 part ammonium chloride and resins as shown below.

TABLE XVIII

| Test designation | Resin tradename | Resin type | Parts as is |
|---|---|---|---|
| A | None | | |
| B | "Resloom" HP | Trimethylol melamine. | 8.0 |
| C | "Aerotex" MW | Melamine | 17.2 |
| D | "Aerotex" M3 | do | 12.8 |
| E | "Aerotex" 44 | Triazine | 33.2 |
| F | "Aerotex" 23S | do | 27.2 |
| G | "Cymel" 300 | Melamine | 16.5 |
| H | "Permafresh" 197 | Urea | 33.6 |
| I | "Permafresh" LCR | Triazone | 37.0 |
| J | Di(methoxymethyl) urea | Urea | 18.4 |

The amounts of resin precondensates used were chosen to be equivalent in analyzed nitrogen content of the treated fabric in this experiment.

The fabrics were dried 10 minutes at 100° C. and then cured for 3 minutes at 170° C. Fammability and analytical test data are shown in Table XIX.

TABLE XIX

| | Mixture No. | | | | | | | | | |
|---|---|---|---|---|---|---|---|---|---|---|
| | A | B | C | D | E | F | G | H | I | J |
| Lot: | | | | | | | | | | |
| Initial | 0.271 | 0.304 | 0.293 | 0.298 | 0.278 | 0.294 | 0.290 | 0.275 | 0.265 | 0.291 |
| 1 HW | 0.218 | 0.284 | 0.285 | 0.287 | 0.266 | 0.286 | 0.286 | 0.258 | 0.247 | 0.272 |
| 20 HW | 0.207 | 0.274 | 0.280 | 0.284 | 0.254 | 0.281 | 0.281 | 0.251 | 0.232 | 0.265 |
| Percent P: | | | | | | | | | | |
| Initial | 2.50 | 2.35 | 2.61 | 2.53 | 2.42 | 2.57 | 2.57 | 2.23 | 2.29 | 2.42 |
| 20 HW | 0.79 | 1.57 | 2.11 | 1.82 | 1.58 | 2.04 | 2.18 | 1.49 | 1.21 | 1.62 |
| Percent N: | | | | | | | | | | |
| Initial | 1.11 | 3.36 | 3.33 | 3.30 | 2.90 | 3.14 | 3.32 | 3.05 | 3.16 | 3.20 |
| 20 HW | 0.32 | 2.88 | 3.08 | 2.91 | 2.39 | 2.93 | 3.04 | 2.52 | 2.24 | 2.72 |

EXAMPLE XXII

Dry cleaning durability of fire retardant effect

Samples of 8-oz. cotton twill were padded to 62% pickup of aqueous solutions containing the following percentages of solute.

TABLE XX

| | Sample designation | | | |
|---|---|---|---|---|
| | A | B | C | D |
| Diethyl N-hydroxymethyl phosphoramidate | 24 | 24 | 36 | 48 |
| Trimethylol melamine | 7.5 | 15 | 10 | 10 |
| NH₄Cl | 0.4 | 0.5 | 0.5 | 0.5 |

The padded fabrics were dried under infrared lamps in a 120° C. oven and then cured for 1.7 minutes in a hot oven circulating 175–185° C. air.

Portions of each sample were subjected to one and to five dry cleaning cycles. The effect of dry cleaning cycles on flammability is shown in Table XXI.

TABLE XXI

| | LOI values | | |
|---|---|---|---|
| Sample designation | Initial | After one dry clean | After 5 dry cleans |
| A | 0.305 | 0.303 | 0.290 |
| B | 0.325 | 0.318 | 0.315 |
| C | 0.319 | 0.315 | 0.308 |
| D | 0.318 | 0.315 | 0.300 |

EXAMPLE XXIII

Diethyl N-methyl-N-hydroxymethyl phosphoramidate 25 parts of diethyl N-methyl phosphoramidate, were dissolved in 18.3 parts 37% formalin. 20% sodium hydroxide solution was added until the solution pH was 11.0, causing the temperature to rise to 40° C. The solution was allowed to stand 60 minutes and then the pH was adjusted to 7.0 with 10% hydrochloric acid. Product in solution was identified by P–31 nuclear magnetic resonance (NMR) as diethyl N-methyl-N-(hydroxymethyl) phosphoramidate.

By carrying out this reaction using 21 parts dimethyl N-methyl phosphoramidate in place of diethyl N-methyl phosphoramidate one may prepare dimethyl N-methyl-N-(hydroxymethyl) phosphoramidate.

EXAMPLE XXIV

Flameproofing effectiveness of diethyl N-methyl-N-(hydroxymethyl) phosphoramidate Water solutions were prepared containing the following parts of component per 100 parts solution.

TABLE XXII

| Component | Sample designation | |
|---|---|---|
| | A | B |
| Diethyl N-methyl-N-(hydroxymethyl) phosphoramidate | 23.5 | 23.5 |
| Trimethylol melamine | | 10 |
| Ammonium chloride | 0.5 | 0.5 |

8-ounce cotton twill fabrics were padded in these solutions to 87% pickup. The fabrics were dried 15 minutes at 100° C. and cured at 165° C. for 4 minutes. Flammability of portions of the samples are indicated in Table XXIII.

TABLE XXIII

| Sample | LOI | | |
|---|---|---|---|
| | Initial | After 1 Home Wash | After 20 Home Washes |
| A | 0.258 | 0.219 | 0.212 |
| B | 0.304 | 0.285 | 0.286 |

This shows that a hydrogen in the phosphoramidic acid nitrogen does not play a major role in the fire retardant mechanism or fixation of the compound to the fabric.

EXAMPLE XXV

Preparation of 2-(hydroxymethylamino)-4-methyl-1,3,2-dioxaphosphorinane 299 parts of 4-methyl-1,3,-dioxaphosphorinane, prepared according to A. A. Oswald, Can. J. Chem. 37, 1498 (1959), were dissolved in 560 parts carbon tetrachloride and ammonia gas was bubbled through the solution until the slightly exothermic reaction and absorption of ammonia ceased. Solvent was evaporated under vacuum at 50° leaving a solid residue. Extraction of the residue with chloroform provided 2 - amino - 4 - methyl-1,3,2-dioxaphosphorinane, melting 172–173° C. 51 parts this material was dissolved in 55.1 parts 37% formaldehyde solution. The pH of the solution was raised to 9.0 with 8 normal sodium hydroxide and allowed to stand 15 hours. The product in solution was identified by NMR to have the expected 2-(hydroxycethylamino) substituent on the 4-methyl-1,3,2-dioxaphosphorinane ring.

EXAMPLE XXVI

Flame retardancy by 2-(hydroxymethylamino)-4-methyl-1,3,2-dioxaphosphorinane

Solutions containing the below listed parts of component per 100 parts solution were padded on 8-oz. cotton twill fabrics to 77–80% pickup, dried 10 minutes at 110° C. and cured 4 minutes at 165° C. Pieces of the samples were tested for nitrogen and phosphorus content and for flammability as shown in Table XXIV.

TABLE XXIV

| Component | Sample designation | | | | | | |
|---|---|---|---|---|---|---|---|
| | A | B | C | D | E | F | G |
| 2-(hydroxymethylamino)-4-methyl-1,3,2-dioxaphosphorinane | 10 | 14.7 | 12.7 | 7.5 | 10 | 7.5 | 10 |
| Trimethylol melamine | | 9.3 | 11.1 | 8.0 | 8.0 | 8.0 | 8.0 |
| 2-amino-2-methyl-1-propanol hydrochloride | 1.05 | 1.05 | 1.05 | 1.05 | 1.05 | 1.05 | 1.05 |
| Elemental analyses: | | | | | | | |
| Percent P | 2.91 | 2.57 | 1.65 | 1.98 | 1.57 | 2.01 | |
| Percent N | 4.35 | 4.50 | 3.57 | 3.38 | 3.13 | 3.32 | |
| LOI tests: | | | | | | | |
| Initial | 0.280 | 0.324 | 0.310 | 0.281 | 0.293 | 0.279 | 0.304 |
| After 1 Home Wash | 0.211 | 0.302 | 0.313 | 0.276 | 0.289 | 0.279 | 0.294 |
| After 20 Home Washes | 0.198 | 0.299 | 0.313 | 0.250 | 0.276 | 0.260 | 0.279 |

After one home wash the treated fabrics had the same hand as the untreated fabrics.

EXAMPLE XXVII

Dimethyl N,N-bis(hydroxymethyl)phosphoramidate

A solution of 125 parts dimethyl phosphoramidate in 202 parts 37% formalin was adjusted to pH 10.5 with 20% sodium hydroxide solution. After an overnight stand the solution was concentrated at 65° C. under vacuum to give a colorless viscous oil. IR and NMR spectra of the product were consistent with the expected structure. Elemental analyses of the clarified oil showed C–26.3%, H–6.25%, N–7.7% and P–16.45%; theoretical C–25.93%, H–6.54%, N–7.57% and P–16.73% based on

$C_4H_{12}O_5NP$

EXAMPLE XXVIII

Diethyl N,N-bis(hydroxymethyl) phosphoramidate

The procedure of Example 21 was followed except that 153 parts diethyl phosphoramidate was used instead of dimethyl phosphoramidate. IR and NMR spectra of the product were consistent with the expected structure. Elemental analysis of the clarified oil product showed C–34.35%, H–7.25%, N–6.45% and P–14.25%; theoretical C–33.80%, H–7.57%, N–6.57% and P–14.53% based on $C_6H_{16}O_5NP$.

EXAMPLE XXIX

Diethyl N,N-bis(methoxymethyl) phosphoramidate

A solution of 46 parts diethyl N,N-bis(hydroxymethyl) phosphoramidate in 150 parts methanol was cooled to 4° C. and gassed by a slow stream of hydrogen chloride gas at 4–8° C. After standing overnight at room temperature the pH reading of the solution was brought to 7.2 by the addition of solid sodium bicarbonate. The mixture was filtered and the filtrate was concentrated at 50° C. under vacuum until the methanol was removed. The residue, containing sodium chloride, was extracted with 135 parts ethyl acetate. The extract was filtered and the filtrate was distilled under vacuum. A colorless mobile oil was collected at 70–78° C./0.25 mm. Hg which showed the IR and NMR spectra expected of the N,N-bis(methoxymethyl) derivative. Elemental analysis of the oil showed C–39.7%, H–8.4%, N–5.95%, P–12.85%, theoretical C–39.82%, H–8.36%, N–5.81%, P–12.89% based on $C_8H_{20}O_5NP$.

EXAMPLE XXX

Dimethyl N,N-bis(methoxymethyl)phosphoramidate

Using the procedure of Example 23 but with 40 parts dimethyl phosphoramidate in place of the diethyl phosphoramidate a colorless mobile oil was collected at 78–80° C./0.5 mm. Hg which showed the IR and NMR spectra expected of the N,N-bis(methoxymethyl) derivative. Elemental analysis of the oil showed C–33.55%, H–7.55%, N-6.6% and P-14.75%; theoretical C-33.80%, H-7.57%, N-6.57%, P-14.53% based on $C_6H_{16}O_5NP$.

EXAMPLE XXXI

Dialkyl N,N-bis(hydroxymethyl) phosphoramidates as flame retardants

Solutions containing the below listed parts of component per 100 parts of solution were padded on 8-oz. cotton twill fabrics to 77% pickup, dried 10 minutes at 110° C. and cured 4 minutes at 165° C. Flammability test data for the treated fabrics is also shown in Table XXV.

identified as diethyl phosphoramidate, was 40% of the product.

(B) This mixture was added to its molar equivalent of 37% formaldehyde solution, made alkaline with sodium hydroxide solution for two hours, neutralized with hydrochloric acid and padded on 8 oz. cotton twill fabrics from diluted solutions of varied concentrations each containing 4% 2-methyl-2-aminopropanol hydrochloride. The padded materials were dried at 110° C. for 10 minutes and cured 5 minutes at 165° C. Fire resistance according to phosphorus and nitrogen content as well as after laundering stages is shown in Table XXVII.

TABLE XXV

|  | Test designation | | | | | | | |
|---|---|---|---|---|---|---|---|---|
|  | A | B | C | D | E | F | G | H |
| Components: | | | | | | | | |
| Dimethyl-N,N-bis(hydroxymethyl)phosphoramidate | 25 | 35 | 25 | 25 | | | | |
| Diethyl-N,N-bis(hydroxymethyl)phosphoramidate | | | | | 25 | 35 | 25 | 25 |
| Trimethylol melamine | | | 4 | 8 | | | 4 | 8 |
| 2-methyl-2-amino-1-propanol hydrochloride | 0.7 | 0.7 | 0.7 | 0.7 | 0.7 | 0.7 | 0.7 | 0.7 |
| LOI tests: | | | | | | | | |
| Initial | 0.288 | 0.304 | 0.295 | 0.308 | 0.270 | 0.274 | 0.278 | 0.285 |
| After 1 Home Wash | 0.261 | 0.276 | 0.279 | 0.298 | 0.250 | 0.257 | 0.267 | 0.276 |
| After 20 Home Washes | 0.250 | 0.273 | 0.266 | 0.284 | 0.249 | 0.252 | 0.254 | 0.266 |

This example points up the outstanding durability of flameproofing provided by these phosphorus compounds alone as well the reinforced flameproofing provided by combining them with resins.

EXAMPLE XXXII

Solutions containing the below tested parts of components per 100 parts solution were padded on 8-oz. cotton twill fabrics to a pickup of 77%, dried 12 minutes at 75° C. and cured for 3 minutes at 170° C. Elemental analysis of the treated fabrics and flammability tests are also shown in Table XXVI.

TABLE XXVI

|  | Test designation | |
|---|---|---|
|  | A | B |
| Component: | | |
| Dimethyl N,N-bis(methoxymethyl) phosphoramidate | 40 | |
| Diethyl N,N-bis(methoxymethyl) phosphoramidate | | 40 |
| 2-methyl-2-amino-1-propanol hydrochloride | 0.7 | 0.7 |
| LOI tests: | | |
| Initial | 0.269 | 0.255 |
| After 1 Home Wash | 0.253 | 0.250 |
| After 20 Home Washes | 0.251 | 0.243 |
| Elemental initial analysis: | | |
| Percent P | 2.01 | 2.03 |
| Percent N | 0.91 | 0.93 |

This example points up the outstanding durability of flameproofing provided by these compounds alone.

EXAMPLE XXXIII

Mixed methyl ethyl N-(hydroxymethyl) phosphoramidates (A) 45.4 parts phosphorus trichloride was added incrementally to an equimolar mixture of 23 parts anhydrous ethanol and 17 parts anhydrous methanol in 51.2 parts carbon tetrachloride and 74 parts chloroform at a reaction temperature controlled by cooling to not over 40° C. 22.7 parts anhydrous ammonia is added with similar temperature control. A precipitate of ammonium chloride which formed in the reacted mass was filtered off. The filtrate was stripped of solvent at a pot temperature up to 80° C. at an absolute pressure of 20 mm. Hg. The undistilled product was subjected to vapor phase chromatography and showed that a first fraction, identified as dimethyl phosphoramidate, was 10% of the product, an intermediate fraction of methyl ethyl phosphoramidate was 50% of the product and a last fraction,

TABLE XXVII

|  | Test designation | | | |
|---|---|---|---|---|
|  | A | B | C | D |
| Initial percent P | 1.71 | 1.84 | 2.57 | 2.58 |
| Percent P after 20 Home Washes | 1.12 | 1.36 | 1.49 | 1.69 |
| Initial percent N | 2.86 | 3.97 | 3.15 | 3.67 |
| Percent N after 20 Home Washes | 2.61 | 2.57 | 3.67 | 3.69 |
| Initial LOI | 0.287 | 0.300 | 0.309 | 0.321 |
| LOI after one Home Wash | 0.260 | 0.267 | 0.288 | 0.301 |
| LOI after 20 Home Washes | 0.256 | 0.269 | 0.278 | 0.299 |

EXAMPLE XXXIV

Diethyl N-(hydroxymethyl) phosphoramidate

Diethyl phosphoramidate (30.6 parts) was dissolved in 16.6 parts 37% aqueous formaldehyde solution. 10% hydrochloric acid solution was added until the solution pH was 2.0. Without further pH adjustments the solution was allowed to stand 24 hours at 25° C. The P-31 NMR spectrum of the product in solution was consistent with the expected N-(hydroxymethyl) compound.

Dimethyl N-(hydroxymethyl) phosphoramidate can be made by the same procedure in which, however, 25.0 parts dimethyl phosphoramidate is used in place of diethyl phosphoramidate.

What is claimed is:

1. A compound having the formula

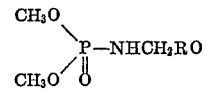

wherein R=H, $CH_3$, $-C_2H_5$ or $-C_3H_7$.

2. The compound of claim 1 in which R=H.
3. The compound of claim 1 in which R=$-CH_3$.
4. A compound having the formula

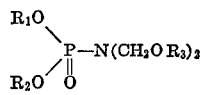

wherein $R_1$ is a $O_1$ to $C_3$ alkyl group, $R_2$ is a $C_1$ to $C_3$ alkyl group and $R_3$ is H or a $C_1$ to $C_3$ alkyl group.

5. The compound of claim 4 in which each of $R_1$ and $R_2 = CH_3$.

References Cited
UNITED STATES PATENTS

| | | | |
|---|---|---|---|
| 3,294,710 | 12/1966 | Rosenberg et al. | 260—953 UX |
| 3,440,222 | 4/1969 | Walsh et al. | 260—953 X |
| 3,584,085 | 6/1971 | Hartmann | 260—953 |
| 3,256,249 | 6/1966 | Vogt et al. | 260—953 X |
| 3,335,129 | 8/1967 | Vogt et al. | 260—953 X |

JOSEPH P. BRUST, Primary Examiner

U.S. Cl. X.R.

117—136, 137; 252—8.1; 260—29.4, 953

PO-1050
(5/69)

UNITED STATES PATENT OFFICE
CERTIFICATE OF CORRECTION

Patent No. 3,767,736     Dated 10/23/73

Inventor(s) Patrick Michael Burke

It is certified that error appears in the above-identified patent and that said Letters Patent are hereby corrected as shown below:

In claim 1, the formula should read as follows:

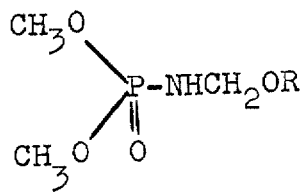

In claim 4, column 22, line 74, "$O_1$" should read -- $C_1$ --.

Signed and sealed this 12th day of February 1974.

(SEAL)
Attest:

EDWARD M. FLETCHER, JR.
Attesting Officer

C. MARSHALL DANN
Commissioner of Patents